(12) United States Patent
McCorkindale et al.

(10) Patent No.: US 8,867,741 B2
(45) Date of Patent: Oct. 21, 2014

(54) MOBILE FIELD LEVEL ENCRYPTION OF PRIVATE DOCUMENTS

(75) Inventors: Mary Catherine McCorkindale, Fairport, NY (US); Saurabh Prabhat, Webster, NY (US); Michael Robert Campanelli, Webster, NY (US); Vinoth Kumar Arputharaj, Tirunelveli, IN (US)

(73) Assignee: Xerox Corporation, Norwalk, CT (US)

( * ) Notice: Subject to any disclaimer, the term of this patent is extended or adjusted under 35 U.S.C. 154(b) by 50 days.

(21) Appl. No.: 13/446,184

(22) Filed: Apr. 13, 2012

(65) Prior Publication Data

US 2013/0272523 A1 Oct. 17, 2013

(51) Int. Cl.
*H04N 1/44* (2006.01)

(52) U.S. Cl.
USPC .......................................... 380/243; 713/189

(58) Field of Classification Search
USPC ................................................... 380/23, 243
See application file for complete search history.

(56) References Cited

U.S. PATENT DOCUMENTS

| | | | |
|---|---|---|---|
| 5,321,749 A | 6/1994 | Virga | |
| 5,903,646 A * | 5/1999 | Rackman | 705/51 |
| 7,861,096 B2 | 12/2010 | Staddon et al. | |
| 7,865,742 B2 | 1/2011 | Staddon et al. | |
| 7,873,838 B2 | 1/2011 | Staddon et al. | |
| 7,940,929 B1 * | 5/2011 | Sengupta | 380/51 |
| 2008/0204788 A1 * | 8/2008 | Kelly et al. | 358/1.15 |
| 2009/0025063 A1 * | 1/2009 | Thomas | 726/4 |
| 2009/0296166 A1 * | 12/2009 | Schrichte | 358/474 |
| 2009/0323087 A1 * | 12/2009 | Luo | 358/1.9 |
| 2010/0033753 A1 * | 2/2010 | Stephenson | 358/1.15 |
| 2010/0070396 A1 * | 3/2010 | Schrichte | 705/34 |
| 2011/0055049 A1 * | 3/2011 | Harper et al. | 705/27.1 |
| 2011/0107110 A1 * | 5/2011 | Naka et al. | 713/189 |
| 2011/0119576 A1 * | 5/2011 | Aumann | 715/255 |
| 2012/0047553 A1 * | 2/2012 | Stronger et al. | 726/1 |
| 2012/0240220 A1 * | 9/2012 | Smith | 726/17 |
| 2014/0022260 A1 * | 1/2014 | Atteberry et al. | 345/467 |

OTHER PUBLICATIONS

Jessica Staddon; A Content-Driven Access Control System; year: 2008; ACM; pp. 1-10.*

* cited by examiner

*Primary Examiner* — Monjour Rahim
(74) *Attorney, Agent, or Firm* — Fay Sharpe LLP

(57) ABSTRACT

A method and system are disclosed for field level encryption of a document that provides a hardcopy having redacted sensitive information fields with multiple levels of access and an augmented reality view of the hardcopy displaying the unredacted sensitive information fields. Identification of the sensitive information fields may be accomplished via highlight color, user designation, or linguistic analysis. The identified fields are encrypted and may be stored separately, embedded in place, or embedded in a two-dimensional glyph. This information may be stored in association with a device identification of an authenticated mobile device and a document identification. A redacted hardcopy of the original document is output. A mobile device captures an image of the redacted hardcopy, decrypts the encrypted sensitive information fields, and generates an augmented reality view of the hardcopy with the previously redacted sensitive information fields visible on the display of the mobile device.

21 Claims, 14 Drawing Sheets

SETTLEMENT AND RELEASE AGREEMENT

THIS SETTLEMENT AGREEMENT AND RELEASE ("Agreement") is entered into, effective 31st day of March 2010 (the "Effective Date"), by and between IssuerDirect Corporation, a Delaware corporation("Issuer Direct") and Edward Gistaro, an individual ("Gistaro"). Issuer Direct and Gistaro are referred to in this Agreement individually as the "Party" or collectively as the "Parties."

1. Pursuant to an unsecured note payable issued on November 16, 2007, Issuer Direct owes to Gistaro $29,833, including all principal and accrued but paid interest ("Settled Debt"). Issuer Direct and Gistaro desire to settle the Settled Debt pursuant to the terms and conditions of this Agreement.

2. Issuer Direct agrees to issue to Gistaro 229,485 shares of the common stock, par value $.001 per share, of Issuer Direct (the "Shares"), upon the execution of this Agreement in settlement of the Settled Debt. Upon issuance of the Shares to Gistaro, the Shares shall be "restricted securities", as the term is defined under Rule 144 of the Securities Act of 1933, as amended (the "Securities Act") and may not be sold or otherwise transferred unless the Shares have been registered with the Securites and Exchange Commission (the "SEC") in the opinion of counsel other than from Gistaro reasonably satisfactory to Issuer Direct, an exemption from the registration requirements under the Securities Act is available. Gistaro understands and acknowledges that Issuer Direct makes no representations or warranties regarding the future price of the Shares, the current or future value of the Shares, or its current business, operations or financial condition or prospects and, except as expressly set forth in this Agreement, Gistaro has not relied on any representations or warranties from Issuer Direct or its representatives in any manner whatsoever. Gistaro represents and warrants to Issuer Direct that he is an "accredited investor", as such term is defined under Rule 501(a)(3) of the Securities Act, they are acquiring the Shares for their own account and for investment purposes, they have no present intention to distribute the Shares publicly, and they have financial sophistication and knowledge to understand the risk of acceptance of the Shares in cancellation of the Advance and can risk an entire loss of their investment in the Shares.

FROM FIG. 5A

3. In consideration of the performance of Issuer Direct described in Paragraph 3, above, Gistaro, on behalf of itself and its successors, assigns, members, managers, officers, employees, agents, and representatives hereby releases and forever discharges Issuer Direct, together with its successors, assigns, directors, officers, agents, employees, and representatives, from any and all actions, causes of action, claims, liability, demands, damages, costs, and expenses of every kind whatsoever, in law or in equity, known or unknown, contemplated, accrued, existing or not yet mature, which Gistaro has or may have as of the Effective Date relating specifically to the Settled Debt. This paragraph shall not discharge Issuer Direct from any obligations arising out of this Agreement. ~124

4. The Parties represent that they have made no assignment and will make no assignment of the actions, causes of action, or claims released here in.

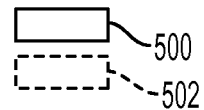
500
502

FIG. 5B

SETTLEMENT AND RELEASE AGREEMENT

THIS SETTLEMENT AGREEMENT AND RELEASE ("Agreement") is entered into, effective ▮ day of ▮ (the "Effective Date"), by and between ▮, a ▮ ▮ and ▮, an individual ("▮"). ▮ and ▮ are referred to in this Agreement individually as the "Party" or collectively as the "Parties."

1. Pursuant to an unsecured note payable issued ▮, ▮ to ▮, including all principal and accrued but paid interest ("Settled Debt"), ▮ and ▮ desire to settle the Settled Debt pursuant to the terms and conditions of this Agreement.

2. ▮ agrees to issue to ▮ shares of the common stock, par value $.001 per share, of ▮ (the "Shares"), upon the execution of this Agreement in settlement of the Settled Debt. Upon issuance of the Shares to ▮, the Shares shall be "restricted securities", as the term is defined under Rule 144 of the Securities Act of 1933, as amended (the "Securities Act") and may not be sold or otherwise transferred unless the Shares have been registered with the Securites and Exchange Commission (the "SEC") in the opinion of counsel other than from ▮ reasonably satisfactory to ▮, an exemption from the registration requirements under the Securities Act is available. ▮ understands and acknowledges that ▮ makes no representations or warranties regarding the future price of the Shares, the current or future value of the Shares, or its current business, operations or financial condition or prospects and, except as expressly set forth in this Agreement, ▮ has not relied on any representations or warranties from ▮ or its representatives in any manner whatsoever. ▮ represents and warrants to ▮ that he is an "accredited investor", as such term is defined under Rule 501(a)(3) of the Securities Act, they are acquiring the Shares for their own account and for investment purposes, they have no present intention to distribute the Shares publicly, and they have financial sophistication and knowledge to understand the risk of acceptance of the Shares in cancellation of the Advance and can risk an entire loss of their investment in the Shares.

FROM FIG. 5C

3. In consideration of the performance of ▮▮▮ described in Paragraph 3, above, ▮▮ on behalf of itself and its successors, assigns, members, managers, officers, employees, agents, and representatives hereby releases and forever discharges ▮▮▮, together with its successors, assigns, directors, officers, agents, employees, and representatives, from any and all actions, causes of action, claims, liability, demands, damages, costs, and expenses of every kind whatsoever, in law or in equity, known or unknown, contemplated, accrued, existing or not yet mature, which ▮▮ has or may have as of the Effective Date relating specifically to the Settled Debt. This paragraph shall not discharge ▮▮▮ from any obligations arising out of this Agreement.

4. The Parties represent that they have made no assignment and will make no assignment of the actions, causes of action, or claims released here in.

FIG. 5D

SETTLEMENT AND RELEASE AGREEMENT

THIS SETTLEMENT AGREEMENT AND RELEASE ("Agreement") is entered into, effective          day of          (the "Effective Date"), by and between          , a                    and          an individual ("     ").          and          are referred to in this Agreement individually as the "Party" or collectively as the "Parties."

1.   Pursuant to an unsecured note payable issued          ,          to          , including all principal and accrued but paid interest ("Settled Debt"),          and          desire to settle the Settled Debt pursuant to the terms and conditions of this Agreement.

2. 600          agrees to issue          shares of the common stock, par value $.001 per share, of          the "Shares" ), upon the execution of this Agreement in settlement of the Settled Debt. Upon issuance of the Shares to          , the Shares shall be "restricted securities", as the term is defined under Rule 144 of the Securities Act of 1933, as amended (the "Securities Act") and may not be sold or otherwise transferred unless the Shares have been registered with the Securites and Exchange Commission (the "SEC") in the opinion of counsel other than from          reasonably satisfactory to          , an exemption from the registration requirements under the Securities Act is available.          understands and acknowledges that          makes no representations or warranties regarding the future price of the Shares, the current or future value of the Shares, or its current business, operations or financial condition or prospects and, except as expressly set forth in this Agreement,          has not relied on any representations or warranties from          or its representatives in any manner whatsoever.          represents and warrants to          that he is an "accredited investor", as such term is defined under Rule 501(a)(3) of the Securities Act, they are acquiring the Shares for their own account and for investment purposes, they have no present intention to distribute the Shares publicly, and they have financial sophistication and knowledge to understand the risk of acceptance of the Shares in cancellation of the Advance and can risk an entire loss of their investment in the Shares.

SENSITIVE INFORMATION

FROM FIG. 6A
600

3. In consideration of the performance of described in Paragraph 3, above, , on behalf of itself and its successors, assigns, members, managers, officers, employees, agents, and representatives hereby releases and forever discharges , together with its successors, assigns, directors, officers, agents, employees, and representatives, from any and all actions, causes of action, claims, liability, demands, damages, costs, and expenses of every kind whatsoever, in law or in equity, known or unknown, contemplated, accrued, existing or not yet mature, which has or may have as of the Effective Date relating specifically to the Settled Debt. This paragraph shall not discharge from any obligations arising out of this Agreement.

4. The Parties represent that they have made no assignment and will make no assignment of the actions, causes of action, or claims released here in.

FIG. 6B

FROM FIG. 6C
600

3. In consideration of the performance of described in Paragraph 3, above, Gistaro, on behalf of itself and its successors, assigns, members, managers, officers, employees, agents, and representatives hereby releases and forever discharges , together with its successors, assigns, directors, officers, agents, employees, and representatives, from any and all actions, causes of action, claims, liability, demands, damages, costs, and expenses of every kind whatsoever, in law or in equity, known or unknown, contemplated, accrued, existing or not yet mature, which has or may have as of the Effective Date relating specifically to the Settled Debt. This paragraph shall not discharge from any obligations arising out of this Agreement.

4. The Parties represent that they have made no assignment and will make no assignment of the actions, causes of action, or claims released here in.

FIG. 6D

SETTLEMENT AND RELEASE AGREEMENT

122
↘THIS SETTLEMENT AGREEMENT AND RE day of March 2010 (the "Effective Date"), by corporation ("Issuer Direct"), and Edward Gls are referred to in this Agreement individually 124
1. ↘ Pursuant to an unsecured note payab

Gistaro $29,833, including all principal and ac

Gistaro desire to settle the Settled Debt purs 122
2. Issuer Direct agrees to issue to Gista share, of Issuer Direct (the "Shares"), upon the

Debt. Upon issuance of the Shares to Gistaro defined under Rule 144 of the Securities Act

FIG. 7B

MOBILE FIELD LEVEL ENCRYPTION OF PRIVATE DOCUMENTS

BACKGROUND

The exemplary embodiment relates to protection of sensitive information. While the systems and methods described herein relate to field level encryption of sensitive information viewable via a mobile device, it will be appreciated that the described techniques may find application in other encryption or mobile applications, for networked computing devices, complex machinery, fault reporting, and the like.

Documents that contain classified, confidential, or personal information (sensitive information) often consist largely of non-sensitive information with a few fields or lines of sensitive information. Such sensitive information may include personal identifiable information (name, social security number, phone numbers, addresses, credit card numbers, etc.), salaries, medical codes, account numbers, private appointments, and the like. Other information may be designated as sensitive pursuant to healthcare medical record privacy laws, mortgage services privacy laws, or designated as confidential/work product during litigation discovery. In such instances, the sharing of electronic copies of a document including sensitive information can pose a number of risks, e.g., the document can be forwarded to unapproved users, stored insecurely, inappropriately modified, and the like.

Hard copies of documents that include sensitive information may be redacted prior to printing, such that the information is removed from the document. In the event that the hard copy is lost or misplaced, no confidential information is jeopardized. This provides some benefits, as having a printed copy of the document may be useful for note taking, negotiations, and the like. Unfortunately, the confidential information may be needed by a user, requiring the user to print an unredacted copy, which may be lost or stolen.

Accordingly, separating the document from the sensitive information in the document can provide additional layers of protection, such that even if such sensitive information is compromised, it would be so out of context as to render it almost unusable.

The level of sophistication and the number of features inherent in GOOGLE, APPLE, MICROSOFT, RIM, and NOKIA mobile devices is increasing at a dramatic rate. Most of these mobile devices offer various security features, e.g., remote wiping of memory, restricted logon, encrypted communications, and the like. Even usage of such mobile devices may be restricted by implementing password or biometric access mechanisms. Furthermore, the size and convenience of these mobile devices surpasses that of a portable computer (laptop, notebook, tablet), making them much more likely to be in the possession of the user at any given time. Accordingly, the use of a mobile device to securely retrieve and store confidential information represents another potential benefit to the user.

Accordingly, there is an unmet need for systems and methods that enable the designation of multiple levels of access to sensitive information and the ability for securely viewing such information.

BRIEF DESCRIPTION

In some illustrative embodiments disclosed as illustrative examples herein, a method for field level encryption of documents includes receiving, by a multifunction device, an image of an original document and identifying a sensitive information field contained in the original document. The method further includes encrypting the identified sensitive information field, and generating a redacted hardcopy of the original document having at least one redacted portion, with the redacted portion corresponding to the encrypted sensitive information field.

In some illustrative embodiments disclosed as illustrative examples herein, a field level document encryption method includes receiving a redacted hardcopy document, the document including at least one redacted portion corresponding to a sensitive information field. The method also includes retrieving, with a mobile device, an encrypted sensitive information field corresponding to the at least one redacted portion of the document and decrypting the encrypted sensitive information field corresponding to the redacted portion. The method further includes capturing, by the mobile device, an image of the redacted hardcopy document and generating a visual representation of the captured image of the hardcopy document on a display associated with the mobile device. Additionally, the visual representation includes the at least one redacted portion replaced with the decrypted sensitive information field.

In some illustrative embodiments disclosed as illustrative examples herein, a field level document encryption system includes a processor, memory in communication with the processor, an associated display, and an image capture component. The memory stores instructions which cause the processor to retrieve an encrypted sensitive information field corresponding to at least one portion of a redacted hardcopy document, and to decrypt the encrypted sensitive information field corresponding to the at least one redacted portion of the document. The memory further stores instructions which cause the processor to capture, using the image capture component, an image of the redacted hardcopy document, and to generate a visual representation of the captured image of the hardcopy document on the associated display. In addition, the visual representation includes the at least one redacted portion replaced with the decrypted sensitive field.

In some illustrative embodiments disclosed as illustrative examples herein, a system for field level encryption of a document includes a processor, memory in communication with the processor, a printer engine, and a scanning component. The memory stores instructions which cause the processor to capture, with the scanning component, an image of an original document, and to identify at least one sensitive information field contained in the original document. The memory further stores instructions which cause the processor to encrypt the identified sensitive information field, and to output, with the printer engine, a redacted hardcopy of the original document having at least one redacted portion, wherein the redacted portion corresponds to the encrypted sensitive information field.

BRIEF DESCRIPTION OF THE DRAWINGS

The present disclosure may take form in certain parts and arrangements of parts, several embodiments of which will be described in detail in this specification and illustrated in the accompanying drawings which form a part hereof and wherein:

FIGS. 5A-5D illustrates an original document with highlighted sensitive information and a redacted version of the document according to one embodiment;

FIGS. 6A-6D illustrates a redacted version of the document with separate sensitive information and a redacted version of the document with sensitive information embedded in a glyph/two-dimensional code according to one embodiment; and FIGS. 7A-7B illustrates a visual representation of a redacted document and a document viewed in augmented reality according to one embodiment.

DETAILED DESCRIPTION

Figure 1:
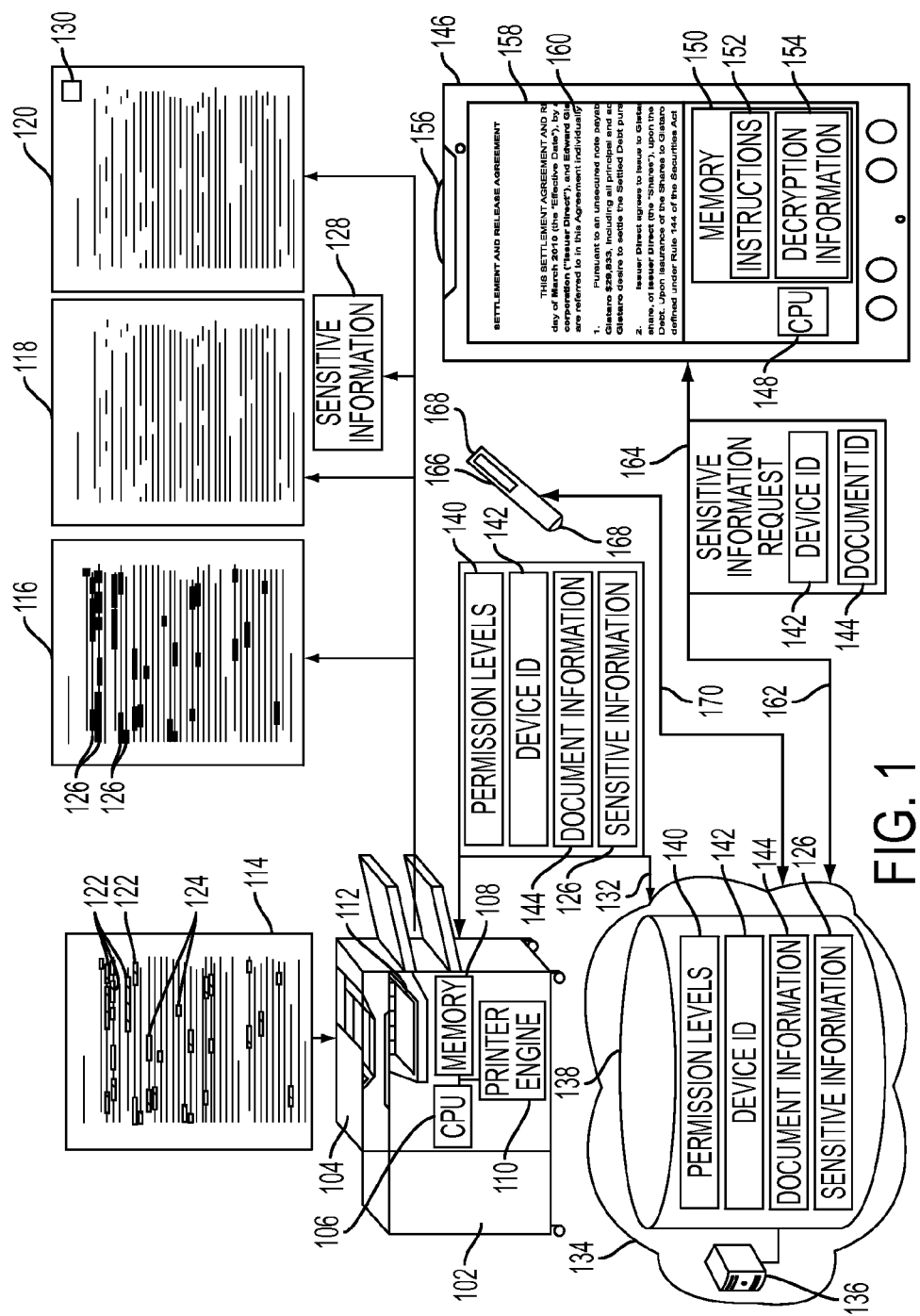
FIG. 1 is a high-level overview of an exemplary system for field level encryption of a document according to one embodiment.

One or more implementations of the subject application will now be described with reference to the attached drawings, wherein like reference numerals are used to refer to like elements throughout.

The embodiments described herein relate generally to a system and method for field level encryption of documents. Although the system finds particular application in document security, it will be appreciated that selected aspects may find application in related areas encountering issues of protecting sensitive or confidential information.

As described herein, there is provided a method for viewing sensitive information using a redacted hardcopy of a document and an authenticated mobile device. The redacted hardcopy may have encrypted sensitive information on the paper itself, such that the mobile device, when authorized, may decrypt such information and overlay the decrypted sensitive information on an image of the document captured by the mobile device. In other embodiments, the mobile device may send a request for the sensitive information using a document identification and a device identification. In such a manner, a user may have both a hardcopy of the document and an authenticated mobile device in order to view the sensitive information. It will be appreciated that such embodiments described herein may provide the convenience of tangible hardcopies of documents, while maintaining the confidentiality of sensitive information.

It will be appreciated that while reference is made herein with respect to the multifunction device 102, or the mobile device 146, the subject systems and methods are equally adaptable to any device capable of implementing the systems and methods described herein. It will further be appreciated that the various components depicted in FIG. 1 are for purposes of illustrating aspects of the subject application, and that other similar components, implemented via hardware, software, or a combination thereof, are capable of being substituted therein.

It will be appreciated that the system 100 for enabling field level encryption for private documents is capable of implementation using a distributed computing environment, such as a computer network 134, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network 134 is comprised of physical layers and transport layers, as illustrated by the myriad of conventional data transport mechanisms, such as, for example and without limitation, Token-Ring, Ethernet, or other wireless or wire-based data communication mechanisms. Furthermore, while depicted in FIG. 1 as a networked set of components, the system and method are capable of implementation on a standalone device adapted to perform the methods described herein.

Figure 2:
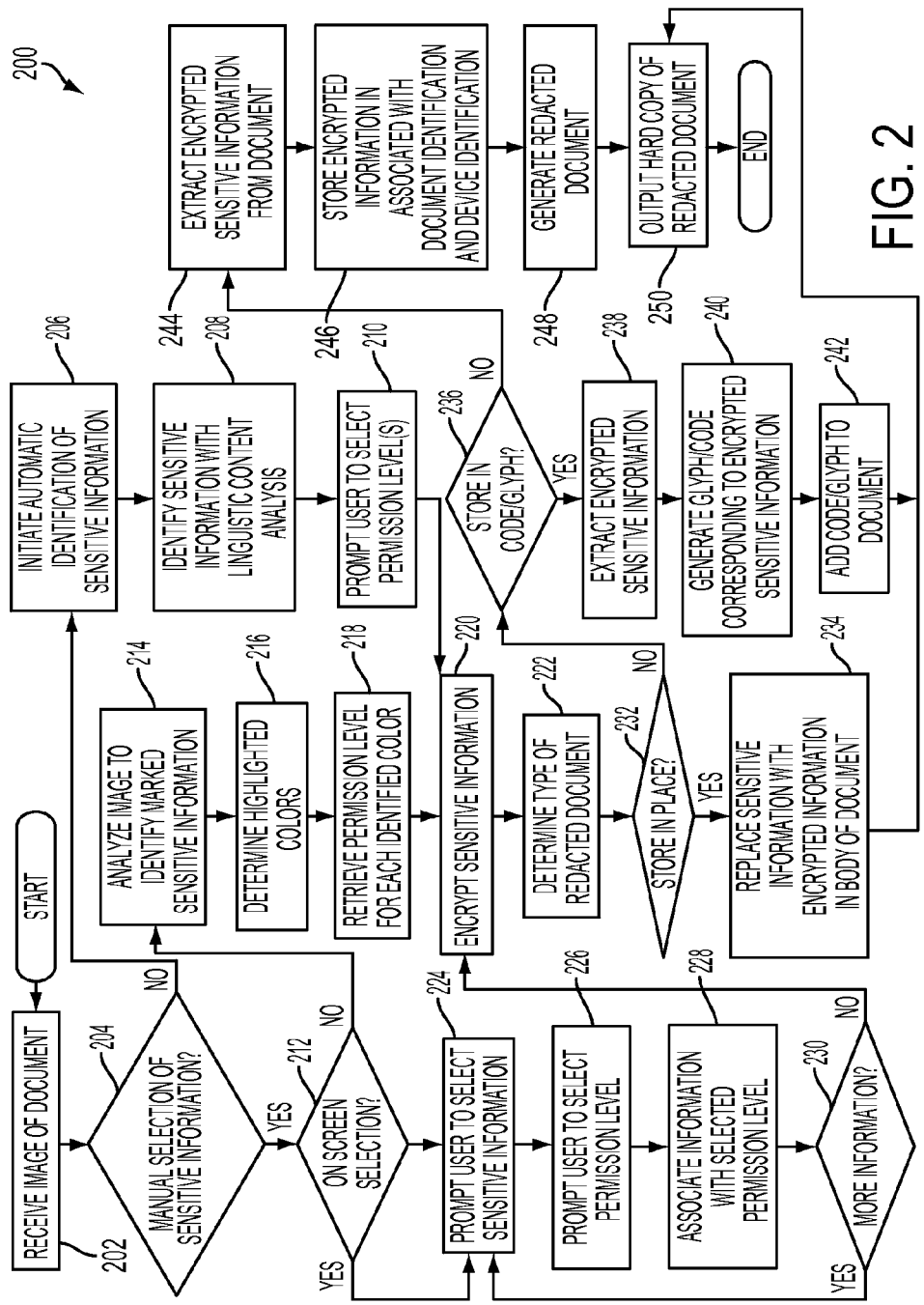
FIG. 2 is a flow chart which diagrammatically shows the operation of a method for field level encryption of a document according to one embodiment.
Figure 3:
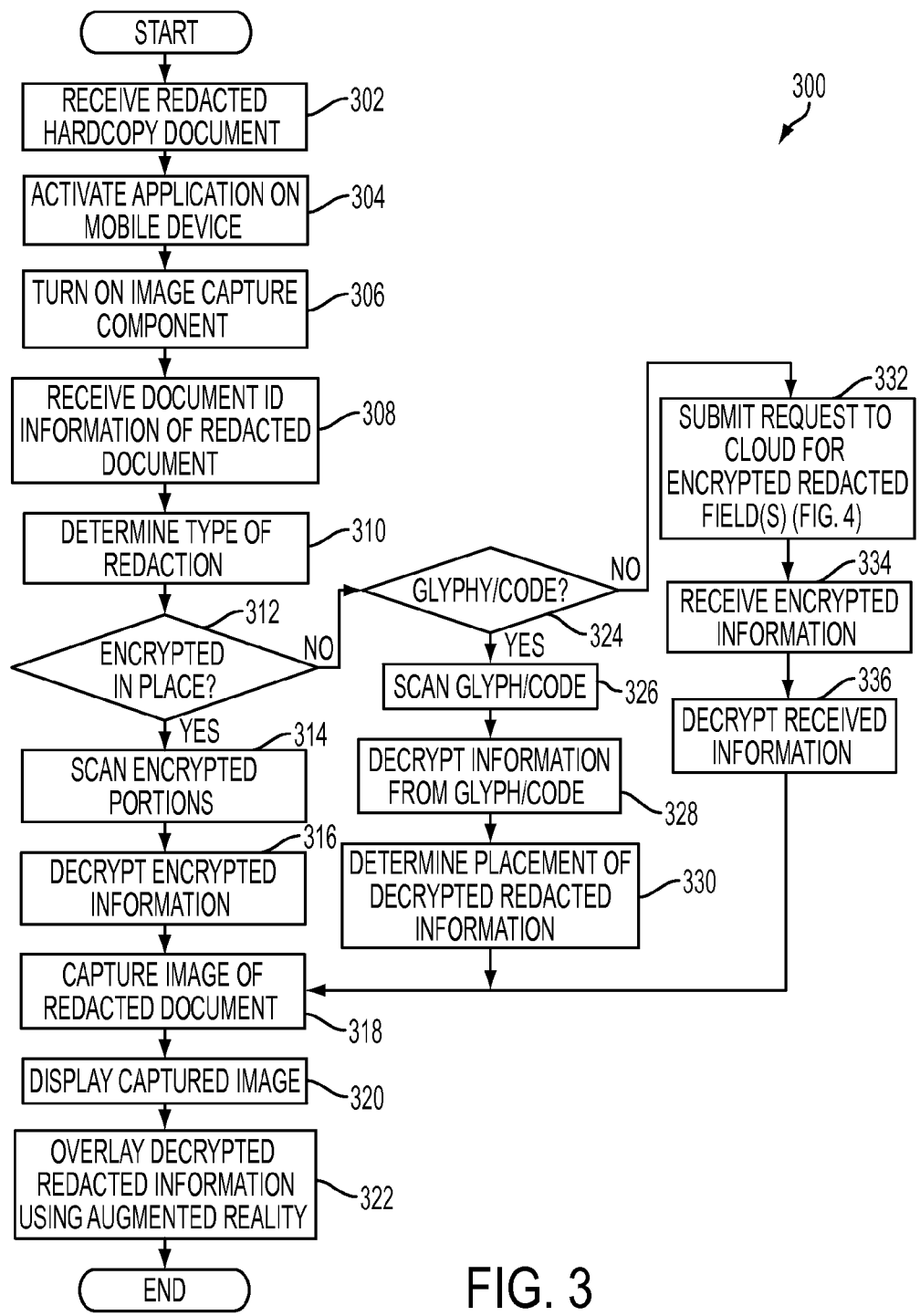
FIG. 3 is a flow chart which diagrammatically shows the operation of method for field level encryption of a document according to one embodiment.
Figure 4:
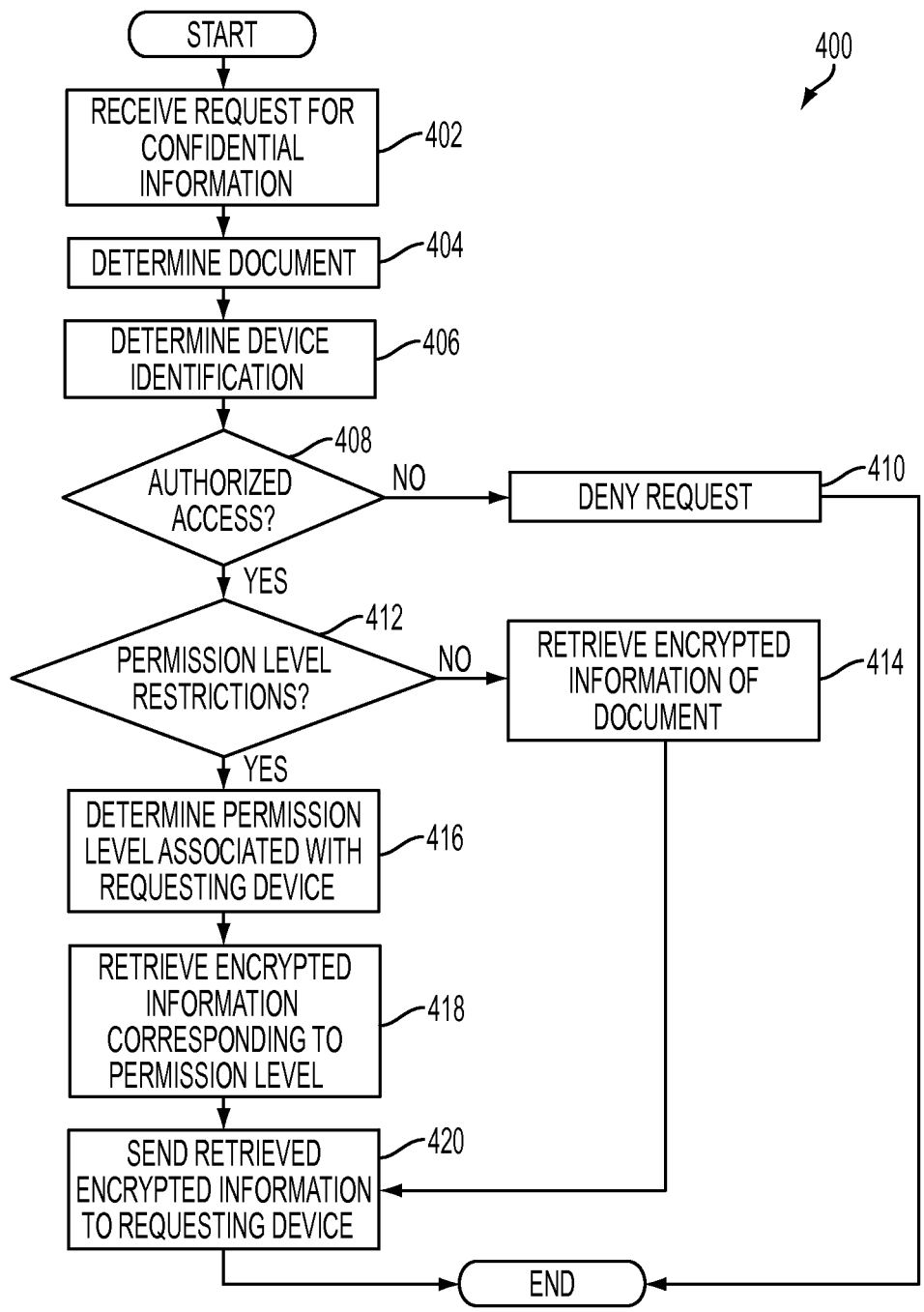
FIG. 4 is a flow chart which diagrammatically shows the operation of method for field level encryption of a document according to one embodiment.

As shown in FIG. 1, the system 100 for enabling mobile field level encryption for private documents includes a multifunction device 102 having a processor 106, which is capable of implementing at least a portion of the exemplary method described in FIGS. 2-4 by execution of software processing instructions which are stored in memory, such as memory 108, which is communicatively coupled to the processor 106. It will be appreciated that the various components depicted in FIG. 1 are for purposes of illustrating aspects of the subject application, and that other similar components, implemented via hardware, software, or a combination thereof, are capable of being substituted therein. The system 100 includes an original document 114 that may be electronically received by the multifunction device 102 or received via operation of an associated scanning component 104. It will be appreciated that the multifunction device 102, may be suitably adapted to perform a variety of document processing operations, including, for example and without limitation, scanning, copying, facsimile transmissions, printing, electronic mail communications, document management, document storage, or the like.

In accordance with one embodiment, the multifunction device 102 is capable of being employed as one possible hardware configuration to support the systems and methods described herein. It will further be appreciated that while the multifunction device 102 is illustrated as a standalone document processing device, any suitable computing environment is capable of being employed in accordance with the subject application. For example, computing architectures including, but not limited to, multiprocessor, distributed, client/server, tablet, mainframe, supercomputer, digital and analog can be employed in accordance with the one embodiment of the subject application. It will further be appreciated that the multifunction device 102 may include a computer server, workstation, personal computer, combination thereof, or any other computing device.

As set forth above, the multifunction device 102 may include a processing unit 106, a system memory 108, a printer engine 110, and a system bus that couples various system components including the scanning component 104, the system memory 108, and the printer engine 110 to the processing unit 106. The processing unit 106 can be any of various commercially available processors. The processing unit 106 can be variously embodied, such as by a single-core processor, a dual-core processor (or more generally by a multiple-core processor), a digital processor and cooperating math coprocessor, a digital controller, or the like. The processing unit 106, in addition to controlling the operation of the multifunction device 102, executes instructions stored in memory 108 for performing the methods outlined in FIGS. 2-4, as described more fully below.

The scanning unit 104 may be any suitable image capture device capable of collecting an electronic representation of an original hardcopy document 114 (a more detailed view of the original document 114 is depicted in FIG. 5, as discussed below). According to one embodiment, the original hardcopy document 114 (as well as subsequent redacted versions 116, 118, 120) may include a document identification 144 so as to identify the document 114, e.g., document name, document number, user/administrator assigned name/number, randomly generated identification name/number, time/date identification, or the like. As depicted in FIG. 1, the original hard copy document 114 may include certain fields 122 and 124 that contain sensitive information (referenced hereinafter as "sensitive information fields 122 and 124"). According to one embodiment, different permission levels 140 may be assigned to different types of sensitive information fields 122 and 124 contained in the original document 114. During one implementation, as discussed below, a user may manually designate such sensitive information fields 122 and 124 using distinct highlighting colors, which may be captured by the scanning component 104 and processed by the processing unit 106 so as to correlate a permission level 140 with the highlighted color of the sensitive information fields 122 and 124. The preceding operation for sensitive information fields 122 and 124 determination is discussed below with respect to FIG. 2.

The term "software," as used herein, is intended to encompass any collection or set of instructions executable by a computer or other digital system so as to configure the computer or other digital system to perform the task that is the intent of the software. The term "software" as used herein is also intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The multifunction device 102 typically includes at least some form of computer readable media. Computer readable media can be any available media that can be accessed by the multifunction device 102. For example, and without limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes, for example, and without limitation, BLUETOOTH, WiMax, 802.11a, 802.11b, 802.11g, 802.11(x), a proprietary communications channel, infrared, optical, the public switched telephone network, or any suitable wireless data transmission system, or wired communications known in the art. Combinations of any of the above can also be included within the scope of computer readable media.

A user may enter commands and information into the computer through an input device 112 such as a touch-screen interface, a keyboard, a pointing device such as a mouse or stylus, a speaker for audible alerts, a microphone for voice input, or a graphical tablet. The input device 112 may include a graphical user interface that enables the user to designate sensitive information fields 122, 124 contained in a scanned document 114, as discussed in greater detail below. The multifunction device 102 is capable of operating in a networked environment using logical and/or physical connections, such as the communications link 132, to one or more remote computers, such as a remote computer(s), depicted as the cloud network 134 of FIG. 1, discussed in greater detail below. A suitable communications link 132 may include, for example, the public switched telephone network, a proprietary communications network, infrared, optical, or any other suitable wired or wireless data transmission communications. The logical connections depicted include a local area network (LAN) and a wide area network (WAN). Such networking environments are commonplace in offices, enterprise-wide computer networks, intranets and the Internet.

The multifunction device 102 may be configured to output varying types of redacted documents, illustrated as the redacted hard copy documents 116 (FIGS. 5C-5D), 118 (FIGS. 6A-6B), and 120 (FIGS. 6C-6D), via the printer engine 110. The printer engine 110 may comprise hardware, software, or a combination thereof, that facilitates output of tangible documents 116, 118, and 120 by the multifunction device 102, e.g., via xerographic, laser, inkjet, electrostatographic, or other printing techniques. It will be appreciated that the three non-limiting examples shown in FIG. 1 are to illustrate several different types of redacted documents capable of being used in the subject systems and methods. However, it will be understood that other types of redacted documents output by the multifunction device 102 are also capable of being used. The type of redacted document 116-120 may correspond to a redacted document 116 having sensitive information 128 encrypted in place 126, a redacted document 118 having sensitive information 128 removed entirely therefrom, and a redacted document 120 having sensitive information encoded in a glyph or 2-dimensional code 130 on the document. Generation of such redacted documents 116-120, identification and encryption of the sensitive information 128, insertion of encrypted sensitive information 128 in place 126, and encoding in a glyph/2D code 130 will be discussed in greater detail below.

The multifunction device 104 is in communication with the cloud 132 via a suitable communications link 130. The multifunction device 104 may include instructions stored in memory that enable the automated recognition and detection of sensitive information 122, 124 in an input document 114, as described below. In one embodiment, the multifunction device 104 communicates permission levels 140, device identification 142, document identification 144, sensitive information 128, and the like to the cloud network 132 so as to allow remote, mobile viewing of sensitive information 128 by the mobile device 146, as discussed in detail below with respect to FIGS. 3-4.

As shown in FIG. 1, the cloud network 132 may include a server 136 in communication with a suitable data storage 138. The server 136 may include a processor and memory storing instructions that facilitate interactions with the multifunction device 102, the mobile device 146, and the like. It will be appreciated that the server 136 may include any hardware, software, or combinations thereof, capable of implementing the systems and methods described herein. Suitable examples of such hardware includes, for example and without limitation, processors, hard disk drives, volatile and non-volatile memory, a system bus, user interface components, display components, and the like. It will further be appreciated that multiple such devices may be used as the server 136 in accordance with the subject application. It will be appreciated that while illustrated in FIG. 1 as being a separate component of the system 100, the data storage device 138 is capable of being implemented as an internal storage component of the server 136, such as, for example and without limitation, an internal hard disk drive, or the like.

In one embodiment, the server 136 and data storage 138 comprise a document management system in data communication with the multifunction device 104 and the mobile device 146. The multifunction device 102 may communicate the permission levels 140, the device identification 142, the document identification 144, and the sensitive information 128 corresponding to the original document 114 to the server 136 for storage in the data store 138. According to one embodiment, the server 136 is accessible to the mobile device 146 via a suitable communications link 162. A suitable communications link 162 may include, for example and without limitation, the public switched telephone network, a proprietary communications network, infrared, optical, or any other suitable wired or wireless data transmission communications. The server 136 may include a processing unit and memory (not shown) to facilitate receipt/communication of the information (e.g., 128, 140-144) to/from the multifunction device 102 and respond to sensitive information requests 162 received from the mobile device 146. Operations with respect to the functioning of the server 136 may be better understood in accordance with FIGS. 2-4, set forth in greater detail below.

The system 100 of FIG. 1 further includes the mobile device 146, which may be representative of any suitable mobile computing device, such as, for example and without limitation, a smart phone, a personal data assistant, netbook, laptop, tablet, notebook, digital pen, camera-enabled electronic book reader, flat-panel portable computers, or the like. Such a mobile device 146 may include any number of hardware components, operating systems, e.g., MICROSOFT, GOOGLE, APPLE, RIM, NOKIA, etc., which are capable of implementation in the embodiments discussed herein. For Example purposes, FIG. 1 depicts the mobile device 146 as a web-enabled cellular telephone including a processor 148, which is capable of implementing at least a portion of the exemplary method described in FIGS. 2-4 by execution of software processing instructions 152 which are stored in memory, such as memory 150, which is communicatively coupled to the processor 148. The mobile device 146 may include a camera or other such image capture device 156 capable of capturing electronic images of objects, e.g., a redacted document 116, 118, or 120. In addition, the mobile device 146 includes a display 158, which may include a touch screen interface, capable of displaying a visual representation of an unredacted document 160. The mobile device 146 may further include hardware, software, and/or any suitable combination thereof, configured to interact with an associated user, a networked device, networked storage, remote devices, or the like. The processor 148 may also control the overall operations of the mobile device 146.

In one embodiment, the memory 150 of the mobile device 146 includes decryption information 154, which may include, for example and without limitation, suitable decryption algorithms, components, software, hardware, or the like, that is capable of decrypting encrypted sensitive information (126, 128, 130). In one embodiment, the decryption information 154 may be received upon authentication of the mobile device 146, i.e., association of the device identification 142 with the document identification 144 (discussed in greater detail below). In another example embodiment, the mobile device 146 may retrieve the decryption information 154 from the server 136 the document identification 144 and the device identification 142 associated with the mobile device 146 upon receipt of one of the redacted hardcopy documents (116, 118, 120). It will further be appreciated that other manners of retrieving or procuring suitable decryption information 154 are also contemplated herein, thus allowing the authenticated mobile device 146 to perform the operations as discussed in greater detail below.

The instructions 152 may include an application that initiates the image capture component 156 so as to scan the hardcopy document 116, 118, or 120, the glyph 130, and the like. According to one embodiment, the instructions 152 further include an augmented reality component that is capable of generating a suitable representation of the unredacted image 160 of the redacted document 116, 118, or 120, as discussed in greater detail below. Upon initiation by a user of the mobile device 146, the image capture component 156 may be activated to scan some identifying indicia of the document 116, 118, or 120 or prompt the user to input some identification information associated with the document 116, 118, or 120.

When the sensitive information fields 122, 124 are encrypted in place, e.g., the sensitive information 126 of document 116, the mobile device 146 may decrypt the encrypted information using decryption information 154 and generate an augmented reality of the entire document 160 on the display 158, rendering the captured image of the document 116 with the decrypted sensitive information fields 122, 124 visible to the user. When the document 118 is identified, a sensitive information request 162 comprising a device identification 142 and the document identification 144 are communicated via the communications link 162 to the server 136. The device identification 142 may correspond to a identifier associated with the mobile device 146, which may be used to associate the mobile device 146 to a particular permission level 140, a particular document 114, or the like. Suitable non-limiting examples of such a device identification 142 may include a cellular number associated with the mobile device 146, a carrier network identification number of the device 146, the MAC address of the device 146, a user-specified identification, a serial number associated with the device, 146, an administratively provided identification, or the like.

The server 136 determines the appropriate permission level 140 (if any) associated with the device identification 142 (e.g., the user of the device 146) and retrieves the sensitive information 128 from the data store 138. This sensitive information 128, along with the proper location on the actual document 118, is communicated back to the mobile device 146, which generates the augmented reality version of the image 160 of the document 118 with decrypted sensitive information displayed to the user. In the event that the document 120 is used, the glyph/2D-code 130 on the document 120 is scanned by the image capture component 156 of the mobile device 146 to ascertain the sensitive information 128 and corresponding position on the page. Thereafter, decryption and rendering of the sensitive information fields 122 and 124 in an augmented reality format is performed on the display 158 of the mobile device 146. These example embodiments are discussed in greater detail below with respect to FIGS. 2-4.

FIG. 1 further illustrates a digital pen 166 having an image capture component 168, a display 170, and a communications link 172 to the cloud 134. It will be understood that the digital pen 166 includes, for example and without limitation, a processor, memory, and instructions corresponding to operating the pen 166. The pen may further include a network interface component (not shown) that may communicate data with the cloud 134. Examples of such digital pens may include LIGHTSCRIBE, ANOTO, and the like. The redacted document 116, 118, or 120 may be printed on dot-paper, such that when the image capture component 168 of the digital pen 166 captures/encounters encrypted or redacted sensitive information 126, software, hardware, or a combination thereof, resident on the pen 166 may decrypt the sensitive information and display the unredacted text in the display 170 of the pen 166. In another similar embodiment, the pen 166 may be networked, such that the pen 166 communicates with the cloud service 134 via the communications link 172 (e.g., Wi-Fi, 802.11( ), BLUETOOTH, wired or wireless, proprietary network, public-switch telephone network, etc.), and requests the missing/encrypted portions of the document 116, 118, or 120. Thereafter, the pen 166 may display the unencrypted/unredacted text on the display 170 when the image capture component 168 of the pen 166 is on the location of the document 116, 118, or 120 corresponding to the encrypted information 126. For purposes of brevity, reference is made hereinafter to the mobile device 146 with respect to FIGS. 2-7B; however it should be appreciated that the pen 166, in addition to the other identified devices, may also function in the manner described below.

Turning now to FIG. 2, there is illustrated a flowchart 200 illustrating one example implementation for field level redaction and encryption. As will be appreciated, the steps of the method need not all progress in the order illustrated and fewer, more, or different steps may be performed. While reference is made herein to the multifunction device 102 being associated with FIG. 2, it will be appreciated that any suitable device is capable of implementation and that the multifunction device 102 is used for example purposes only. The example flowchart 200 may begin at 202, whereupon an image of the document 114 is received by the multifunction device 102. The image of the document 114 may be received by the scanner component 104 or other suitable image capture component, or may be electronically submitted via a networked device, e.g., a user's personal computer, smart phone, tablet, or the like. FIGS. 5A-5B provide a more detailed view of the original document 114, illustrating at least two highlighted colors 500 and 502 corresponding to varying permission levels and associated with sensitive information fields 122, 124.

A determination is then made at 204 whether manual selection of sensitive information fields 122, 124 has been selected. Upon a determination that manual selection of the sensitive information fields 122, 124 in the document 114 has not been selected, operations proceed to 206. At 206, the processor 106 or other suitable component associated with the multifunction device 102 initiates the automatic identification of sensitive information. The processor 106 may initiate instructions stored in memory 108 that cause the processor 106 to analyze the received image of the document so as to identify, at 208, sensitive information fields 122, 124 using linguistic content analysis. For example, sensitive information fields 122, 124 may include social security numbers, names, addresses, personally identifiable information, business information, medical information, monetary numbers, etc., which is identified at 208.

At 210, the user is prompted via the user interface 112 or a graphical user interface displayed on a remote device to select the permission levels 140 to be associated with the identified sensitive information fields 122, 124. For example, the user may designate one user or user role as having access to a first permission level, e.g., view a first level of information, another user or user role to a second permission level greater than the first (more information revealed to this user or role), and so on. In one non-limiting example, the color 500 may be associated with a first permission level for a law clerk, receptionist, billing assistant, etc., and the color 502 may be associated with a second permission level for a paralegal/attorney, nurse/doctor, certified public accountant, etc. According to one embodiment, the permission levels 140 include reference to one or more device identifications 142 corresponding to mobile devices 146 associated with a particular permission level 140 and thus authorized to access the sensitive information fields 122, 124, associated therewith.

After receipt of the permission level(s) 140 at 210, operations proceed to 220 for encryption of the sensitive information fields 122, 124, as discussed in greater detail below. Returning to 204, when manual selection of sensitive information fields 122, 124 is desired, operations proceed to 212, whereupon a determination is made whether onscreen selection (i.e., the user will designate the sensitive information fields 122, 124 via a graphical user interface on the display 112, a remote device, or the like) has been selected. When onscreen selection is not selected at 212, operations proceed to 214.

At 214, the received image of the document 114 is analyzed to identified any marked sensitive information fields 122, 124. In one embodiment, the sensitive information fields 122, 124 may be designated by some type of glyph, highlight color 500, 502, or other such indicia. For example purposes, reference is made hereinafter to highlight color 500, 502 as shown in FIGS. 5A-5B as being indicative of not only sensitive information fields 122, 124, but also a desired permission level 140 associated with the sensitive information i.e., the sensitive information fields 122, 124, i.e., color specific level designations. Thus, at 216, the color 500, 502 of the highlighted sensitive information fields 122, 124 is determined. The permission level 140 for each identified color 500, 502 is then retrieved at 218. The multifunction device 102 may retrieve such permission levels 140 and corresponding color association from the server 136, from internal storage, from user input via the user interface 112, or the like. After determining the varying permission levels 140 (if any) associated with recognized highlight color 500, 502, operations proceed to 220, whereupon the sensitive information fields 122, 124 are encrypted, as discussed in greater detail below.

Returning to 212, when onscreen selection has been indicated by the associated user, operations progress to 224. At 224, the associated user is prompted to select the sensitive information fields 122 or 124. Such prompting may occur via a graphical user interface displayed to the user at the multifunction device 102 via 112, via the remote device, or the like. The associated user is then prompted at 226 to select a permission level 140 to correspond to the selected sensitive information fields 122 or 124. The selected sensitive information fields 122 or 124 is then associated with the selected permission level 140 at 228 and a determination is made at 230 whether any additional sensitive information 122, 124 remains to be designated in the document 114. Upon a positive determination, operations return to 224 for selection of the sensitive information fields 122 or 124, and continue thereon. Upon a negative determination at 230, operations progress to 220, whereupon the sensitive information fields 122, 124 are encrypted.

Encryption of the sensitive information fields 122, 124 may be accomplished using a variety of encryption methodologies, including, for example and without limitation triple DES, public/private key, encrypted QR codes, and the like. After encryption of all sensitive information fields 122 and 124 in the document 114, operations proceed to 222. At 222, a determination as to the type of redacted document (116, 118, or 120) to be output by the printer engine 110 of the multifunction device 102 is made. As illustrated in FIG. 1, three non-limiting example types of output hardcopies of the original document 114 are depicted. It will be appreciated that other forms of redacted documents are also capable of being output via the printer engine 110 and used in accordance with the systems and methods set forth herein. Thus, at 222, a selection as to the type of redacted output is made (e.g., in-place document 116, removed/separately stored document 118, glyph/code 130 stored on page in document 120).

A determination is then made at 232 whether the encrypted sensitive information 128 is to be stored in place, i.e., the encrypted sensitive information 126 of the redacted document 116. As shown in FIGS. 5C-5D, the sensitive information fields 122 and 124 have been replaced with encrypted data 126 in the position on the document 116 corresponding to the original position of the unencrypted sensitive fields 122, 124. It will be appreciated that such embedding may be accomplished using a suitable steganographic technique. Upon a positive determination at 232, operations proceed to 234, whereupon the sensitive information fields 122, 124 of the original document 114 are replaced with the in place encrypted sensitive information 126. A hardcopy of the redacted document 116 having in place encrypted sensitive information 126 is then output by the printer engine 110 of the multifunction device 102 at 250.

Figure 6C:
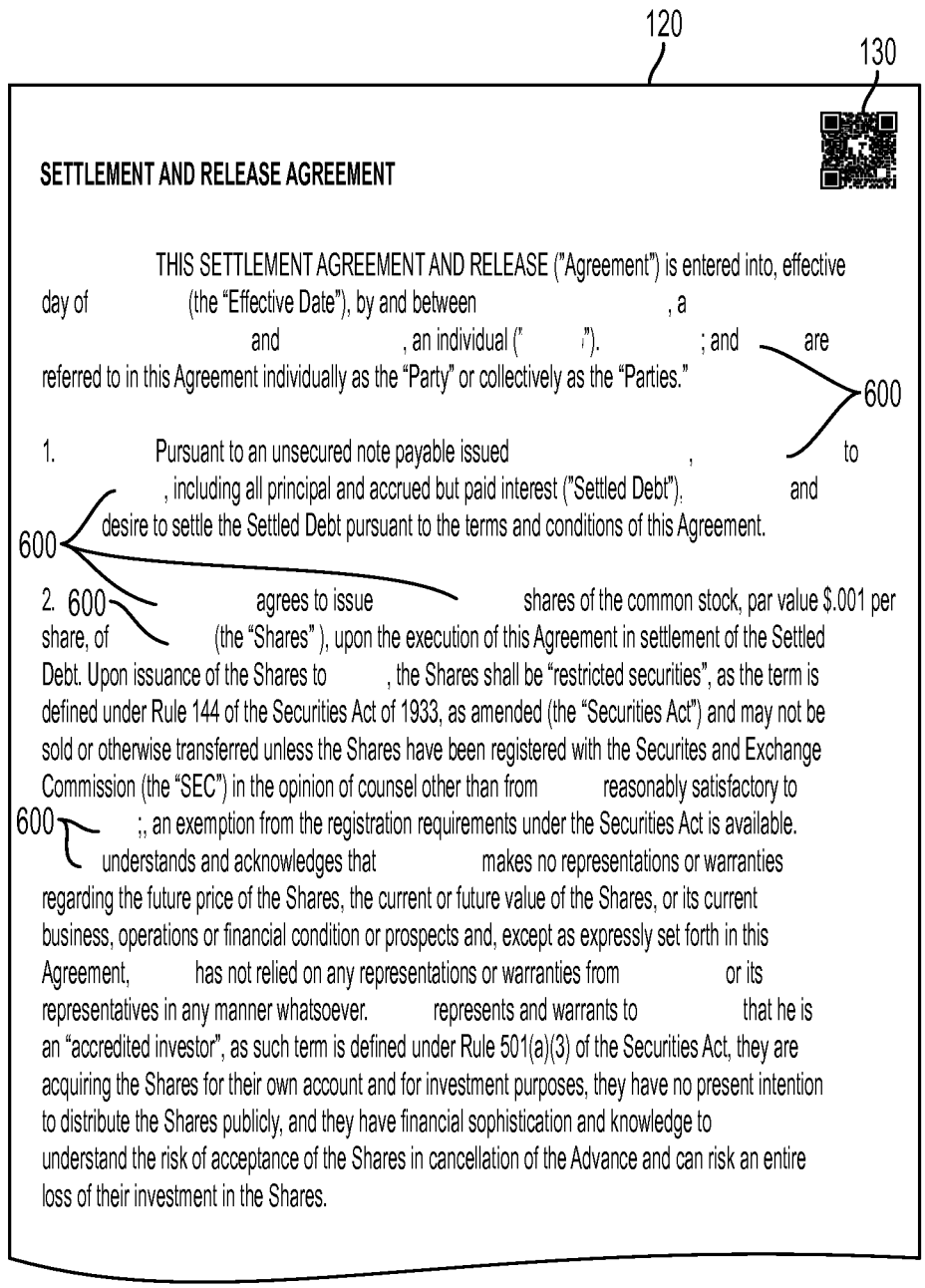

When it is determined at 232 that the encrypted sensitive information 128 is not to be encrypted in place on an output document (e.g., redacted document 116), operations proceed to 236, whereupon a determination is made whether the encrypted sensitive information 128 is to be stored as a glyph/2D code on the output document, e.g., the glyph 130 on the document 120. Upon a positive determination at 236, the encrypted sensitive information 128 is extracted at 238. FIGS. 6C-6D illustrate the document 120 having the sensitive information fields 122, 124 redacted by extraction or removal of such fields 122, 124 from the document 120 as depicted by the blank regions 600. It will be appreciated that the extraction of the encrypted sensitive information 128 may include, for example and without limitation, removing the text from the document while maintaining the spacing (as depicted in FIGS. 6A-6D at 600), replacing the text with a graphic place holder (white rectangle or the like), covering the encrypted text with some form of opaque graphic such that when printed the text is not visible, or the like. The processor 106 or other suitable component associated with the multifunction device 102 then generates a glyph 130 that incorporates the encrypted sensitive information 128 at 240. At 242, this generated glyph is added to the document 120 to be output by the printer engine 110 of the multifunction device 102. The multifunction device 102 then renders a hardcopy of the document 120 including the glyph 130 at 250.

When it is determined at 236 that the encrypted sensitive information 128 is not to be included on the hardcopy output by printer engine 110 the multifunction device 102, operations proceed to 244, whereupon the encrypted sensitive information 128 is extracted (as discussed above) from the document 114. The encrypted information 128 may then be communicated and stored in association with device identification 142 and the document identification 144 on the data storage 138 in data communication with the server 136. In one embodiment, the encrypted information 128 may be associated with the device identification 142 and the document identification 144 and stored in memory 108 of the multifunction device 102, associated with the device identification 142 and the identification 144 and stored in memory 150 of the mobile device 146, or the like.

The redacted document without the sensitive information fields 122, 124, e.g., the document 118, is then generated by the multifunction device 102 at 248, which thereafter outputs, via the printer engine 110, a hardcopy of the document 118 at 250. FIGS. 6A-6B provide an illustration of the document 118 having blank regions 600 functioning as the redaction of the sensitive information fields 122, 124. As discussed above, use of blanking regions 600 is one possible illustration of redaction of the sensitive information fields 122, 124, and other types of redaction or extraction to produce a suitable redacted document may be used, including, for example and without limitation, removing the text from the document while maintaining the spacing, replacing the text with a graphic place holder (e.g., a white rectangle (blanking region 600), black rectangle, icon, or the like), covering the encrypted text with some form of opaque graphic such that when printed the text is not visible, or the like.

It will thereby be appreciated that a hardcopy of a redacted document 116, 118, or 120 may be made available to a user, e.g., associated with the mobile device 146, that is safe to transport without personally identifiable information (sensitive information fields 122, 124) visible to an observer. According to one example embodiment, after output of the redacted document (116, 118, or 120) corresponding to the original input document 114, a user may view the entire, unredacted document, using the mobile device 146. Turning now to FIG. 3, there is shown a flowchart 300 illustrating an exemplary implementation of one example embodiment, wherein a mobile device 146 is capable of viewing sensitive information fields 124, 122 using augmented reality. As will be appreciated, the steps of the method need not all progress in the order illustrated and fewer, more, or different steps may be performed. While reference is made herein to the mobile device 146, other computing systems are also capable of implementation and use in accordance with the example methodology of FIG. 3. For example, and without limitation, a multifunction device or personal computer with attached scanner may make use of the method of FIG. 3.

At 302, a redacted hardcopy 116, 118, or 120 corresponding to an original document 114 is received. As set forth above, the redacted hardcopy 116, 118, or 120 includes at least one redacted portion corresponding to sensitive information, e.g., redacted in place (document 116), fully redacted (documents 118 and 120), etc. At 304, an application is activated on the mobile device 146 corresponding to instructions 152 stored in memory 150 that cause the mobile device 146 to implement the processes identified in FIG. 3. According to one embodiment, the application may be software, hardware, or a combination thereof configured to perform the methodology 300. At 306, an image capture component 156 associated with the mobile device 146 may be activated in accordance with the initiation of the application at 304. It will be appreciated that the image capture component 156 may correspond to a camera associated with the mobile device 146, a scanner (not shown) capable of being used by the mobile device 146, or the like.

The document identification 144 corresponding to the redacted document 116, 118, or 120 is received by the mobile device 146 at 308. It will be appreciated that the document identification 144 may be input by a user associated with the mobile device 146 and in possession of the redacted document 116, 118, or 120, scanned by the mobile device 146 via image capture component 156, received electronically by the mobile device 146, or the like. At 310, the type of redacted document 116, 118, or 120 is determined. According to one embodiment, the processor 148 or other suitable component associated with the mobile device 148 and operative in conjunction with the instructions 152 in memory 150, automatically determines the type of redaction, e.g., in-place (document 116), removed/separately stored (document 118), stored on page in glyph/code (document 120). According to another embodiment, the user indicates the type of redaction via interactions with the display 158 of the mobile device 146. Other manners of determining the type of redaction may also be used in accordance herein, e.g., the document identification 144 may indicate the type of redaction.

A determination is then made at 312 whether the redacted document is an encrypted in place type document, e.g., document 116. That is, a determination is made whether the hardcopy document includes encrypted in place sensitive information 126, such as contained in document 116. Upon a positive determination at 312, operations proceed to 314, whereupon the encrypted portions 126 of the redacted document 116 are scanned via the image capture component 156 of the mobile device 146. According to one embodiment, the mobile device 146 includes previously obtained decryption information 154, i.e., the mobile device 146 is an authenticated mobile device 146. Should the mobile device 146 not be an authorized device, it will not have the appropriate decryption information 154 available to generate a visual representation of the sensitive information fields 122, 124. In another embodiment, the decryption information 154 may be requested from the server 136, via communication of the document identification 144 and the device identification 142, such that only an authenticated/authorized mobile device 146 receives the decryption information 154 necessary to decrypt the sensitive information 126.

The encrypted sensitive information 126 scanned from the document 116 is then decrypted at 316. It will be appreciated that the decryption of the encrypted sensitive information 126 may be performed using the encryption/decryption methods set forth above. In one embodiment, the memory 150 of the mobile device 146 includes suitable decryption information 154, e.g., algorithms, components, software, hardware, or the like, that is capable of decrypting the received encrypted sensitive information 126. According to one example, the mobile device 146 includes previously received decryption information 154, such that the mobile device 146 corresponds to an authenticated device capable of decrypting and viewing the sensitive information 122, 124. Although not shown in FIG. 3, one example embodiment provides for the mobile device 146 to retrieve the decryption information 154 from the server 136 using the received document identification 144 at 308 and the device identification 142 associated with the mobile device 146. It will further be appreciated that other manners of retrieving or procuring suitable decryption information 154 are also contemplated herein, thus allowing the authenticated mobile device 146 to perform the operations set forth with respect to FIG. 3.

Figure 7A:
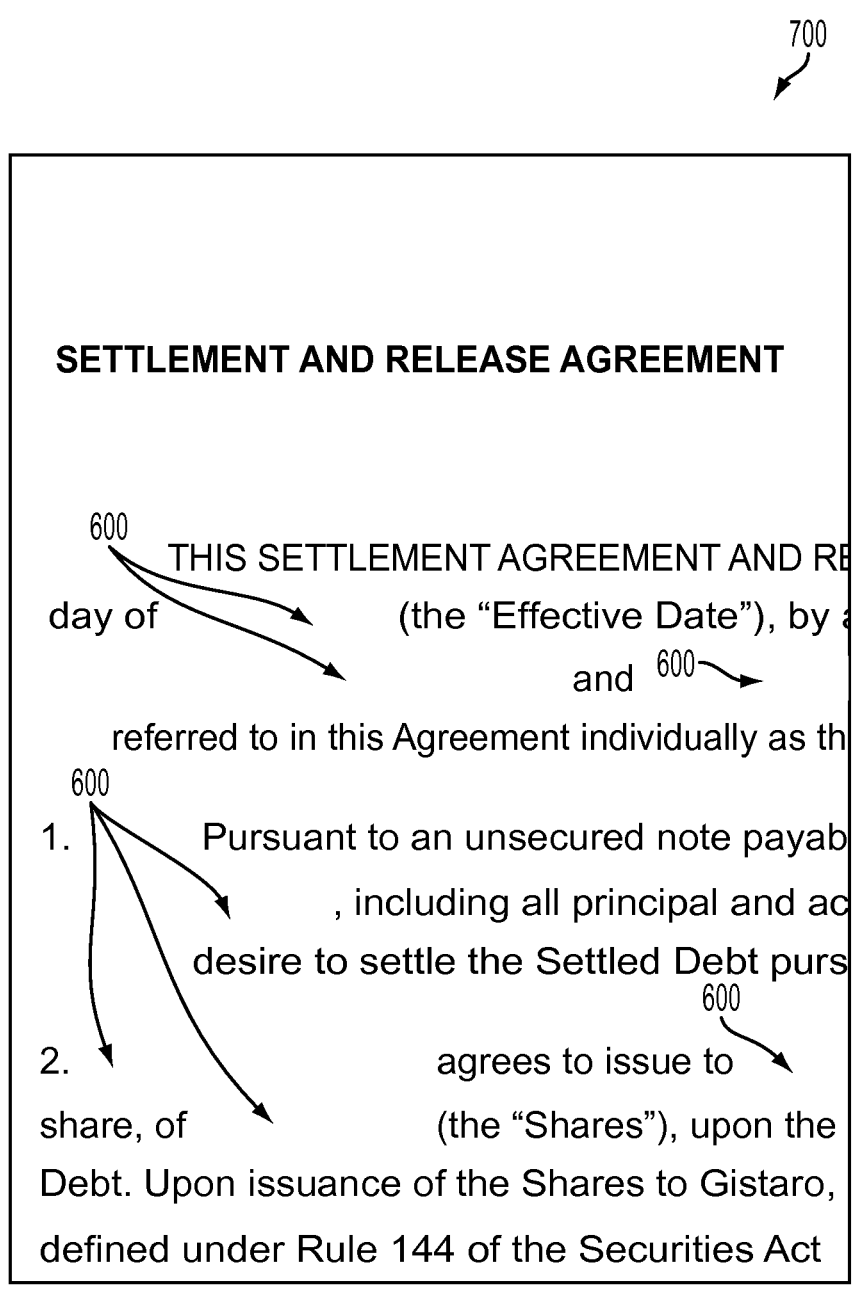

A full image of the redacted document 116 is then captured at 318 via the image capture component 156. The display 158 then generates a visual representation of the full image of the redacted document 116 at 320. At 322, the decrypted sensitive information (i.e., sensitive information 122, 124 from encrypted information 126) is then overlaid on the displayed full image using augmented reality, as depicted in the image 160 of FIGS. 1 and 7. In FIGS. 7A-7B, there is shown an enlarged view 700 of the mobile device display 158 as a visual representation of the redacted document (116, 118, or 120). As illustrated in FIGS. 7A-7B, the view 700 represents the redacted document 116, 118, or 120 as captured by the image capture component 156 and displayed by the mobile device 146. It should be noted that the blanking regions 600 depicted in FIGS. 6A-6D are viewable therein. The enlarged view 702 of FIGS. 7A-7B is a visual representation of the unredacted document 114, such that the previously blank regions 600 have been repopulated on the display 158 of the mobile device 146 with the sensitive information fields 122, 124. That is, the view 702 of FIGS. 7A-7B is an augmented reality view representing the image of document captured by the image capture component 156 with the decrypted sensitive information fields 122, 124 visible to the user of the mobile device 146 as an overlay on the image 700. Thus, the user is able to view the sensitive information fields 122, 124 on the mobile device 146, while possessing both the mobile device 146 and a hardcopy of the redacted document 116. It will be appreciated that such an example implementation allows for the convenience of having a paper copy of a sensitive document, while allowing the actual sensitive information to only be visible to the user of the mobile device 146.

Upon a negative determination at 312, operations proceed to 324, whereon a determination is made whether the redacted document includes a glyph, two-dimensional code, or the like. For example, when the hardcopy of the redacted document is document 120 and includes the glyph 130, operations proceed to 326. It will be appreciated that the determination as to type of redacted document 116, 118, or 120 may be made in accordance with the method addressed above. Upon a positive determination at 324, the glyph/code 130 is scanned using the image capture component 156 of the mobile device 146 at 326. At 328, the sensitive information encrypted within the glyph/code 130 is decrypted. In accordance with one embodiment, the mobile device 146 may receive suitable decryption information 154 based upon its authentication, i.e., its association with a particular authorized user.

As discussed above with respect to 316, the mobile device 146 may have decryption information 154 previously stored in the memory 150 that enables decryption of the glyph, may query the server 136 or multifunction device 102 for the decryption information 154, or the like at 328. According to one embodiment, the procurement and receipt of such decryption information 154, whether or not prior to receipt of the hardcopy document 116, 118, or 120, may have the mobile device 146 be authenticated based upon the device identification 142, the identification of a user associated with the mobile device 146, and the like, which are associated with the respective document 116, 118, or 120 having encrypted sensitive information (124, 128, 130) associated therewith.

The placement, i.e., position, of the decrypted sensitive information fields 122, 124 relative to the document 120 is then determined at 330. According to one embodiment, the glyph 130 includes encrypted sensitive information 128, as well as a location on the page of the document 120 wherein the decrypted sensitive information should be placed during rendering. Operations then proceed to 318-322, as discussed in greater detail above.

Upon a negative determination at 324, operations proceed to 332, whereupon a sensitive information request 162 is sent to the server 136/data storage 138 via the network 134. In accordance with one embodiment, the sensitive information request 162 includes device identification 142 and the document identification 144. In such an embodiment, the device identification 142 may be representative of an identifier associated with the mobile device 146, and the document identification 144 may be representative of an identifier associated with the document 118. The processing of the sensitive information request 162 is illustrated in the example methodology 400 of FIG. 4.

The server 136 receives the sensitive information request 162 at 402 via the communications link 162. It will be appreciated that while reference is made to the server 136 with respect to FIG. 4, the multifunction device 102 or other networked device may also be used to provide the storage, processing, and communications referenced in FIG. 4. As discussed above, the request 162 includes a particular identifier associated with the requested mobile device 146, e.g., the device identification 142, as well as the identifier associated with the document 118, e.g., the document identification 144. The server 136 then searches the data storage 138 so as to determine the appropriate document 118 for which sensitive information 128 has been requested at 404. At 406, the device identification 142 corresponding to the mobile device 146 is determined based upon the received sensitive information request 162.

A determination is then made at 408 whether access to the document 118 identified by the document identification 144 and based upon the identification 142 associated with the requesting mobile device 146 is authorized. Upon a negative determination at 408, i.e., the document 118 corresponding to the received identification 144 is not accessible or the device identification 142 is not properly associated with the document 118, the request 162 is denied at 410 and operations with respect to the server 136 terminate.

When it is determined at 408 that access to the document is authorized, operations proceed to 412. At 412, a determination is made whether the document 118 includes one or more permission levels 140 dictating the amount, type, or content of sensitive information 128 to be made available. When no restrictions, i.e., permission levels 140, are associated with the document 118, operations proceed to 420, whereupon the server 136 communicates the sensitive information 128 associated with the document 118 to the requesting mobile device 146. Upon a determination at 412 that one or more permission levels 140 are associated with the sensitive information 128 of the document 118, operations progress to 416. At 416, the permission level 140 associated with the requesting mobile device 146 is determined. That is, the server 136 queries the data storage 138 to ascertain the permission level(s) which correspond to the device identification 142 received in the sensitive information request 162. The encrypted sensitive information 128 corresponding to the permission level 140 of the requesting mobile device 146 is then retrieved from the data storage 138 at 418. At 420, the retrieved encrypted sensitive information 128 is communicated to the requesting mobile device 146, and operations return to 332 of FIG. 3.

At 334, the mobile device 146 receives the encrypted sensitive information 128 associated with the document 118 and authorized for viewing by the mobile device 146. The received encrypted sensitive information 128 is then decrypted at 336 in the manner described in greater detail forth above. For example, the mobile device 146 may previously have received the decryption information 154 during the association of the device identification 142 with the document identification 144 (as discussed above), have separately requested such information, or the like. Operations then proceed to 328, whereupon the placement of the decrypted sensitive information on the document 118 is determined.

Thereafter, an image of the document 118 is captured by the image capture component 156 of the mobile device 146 at 318. The captured image is then displayed at 320 via the display 158 of the mobile device 146. At 322, the decrypted sensitive information fields 122, 124 is displayed as an overlay on the captured image in augmented reality, as depicted in FIG. 1 at 160. It will be appreciated that employing the methodology of FIGS. 2-4 thereby provides that the redacted text and the remainder of the unredacted text of a document 116, 118, and 120 are together and visible to the user of the authenticated mobile device 146, as set forth above. That is, viewing the sensitive information fields 122 and 124 may be restricted to those circumstances wherein a user possesses both the redacted hardcopy 116, 118, or 120, and the authorized mobile device 146.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for field level encryption of documents, comprising:
   receiving, by a multifunction device, an image of an original hardcopy document;
   identifying a sensitive information field contained in the original hardcopy document, the sensitive information field containing sensitive information;
   encrypting the sensitive information contained in the identified sensitive information field;
   determining a permission level associated with viewing the sensitive information of the sensitive information field;
   identifying at least one highlighted portion of the original hardcopy document, wherein the color of the at least one highlighted portion corresponds to the determined permission level associated with the sensitive information contained in the sensitive information field;
   associating the determined permission level with the encrypted sensitive information of the sensitive information field; and
   generating, by the multifunction device, a redacted hardcopy of the original hardcopy document having at least one redacted portion, wherein the at least one redacted portion corresponds to the encrypted sensitive information field,
   wherein the multifunction device is in communication with a data storage comprising a document identification correlating at least one permission level with the document, and a device identification correlating a mobile device with at least one permission level of the document.

2. The method of claim 1, wherein determining sensitive information field further comprises:
   identifying at least one highlighted portion of the original hardcopy document, wherein the color of the at least one highlighted portion corresponds to the determined permission level associated with the sensitive information contained in the sensitive information field.

3. The method of claim 1, wherein determining sensitive information further comprises:
   performing linguistic content analysis on text of the original document to detect sensitive information; and
   identifying the sensitive information field in accordance with the performed analysis corresponding to the detected sensitive information.

4. The method of claim 1, further comprising:
   generating a glyph representative of the encrypted sensitive information contained in the sensitive information field; and
   rendering the glyph on the redacted hardcopy of the original document.

5. The method of claim 4, wherein the glyph comprises the encrypted sensitive information contained in the sensitive information field and a corresponding location of the sensitive information field on the document.

6. The method of claim 1, further comprising:
   extracting the encrypted sensitive information;
   identifying a document identification associated with the original document;
   identifying a device identification representative of an authorized mobile device;

identifying a permission level associated with the sensitive information field corresponding to the device identification; and storing the encrypted sensitive information field in a data storage in association with the document identification, the device identification, and the corresponding permission level.

7. The method of claim 6, further comprising:

receiving a sensitive information request from a mobile device, the sensitive information request including a document identification and a device identification associated with the mobile device;

searching the data storage for the sensitive information field associated with the received document identification and device identification; and communicating the sensitive information field to the requesting mobile device in accordance with a result of the searching indicating an authorized mobile device.

8. A field level document encryption method, comprising:

receiving a redacted hardcopy document, the hardcopy document including at least one redacted portion corresponding to a sensitive information field;

retrieving, with a mobile device having a device identification associated therewith, an encrypted sensitive information field corresponding to the at least one redacted portion of the hardcopy document, the hardcopy document having a document identification associated therewith, wherein the sensitive information field being encrypted in accordance with a permission level corresponding to an authorization to view the sensitive information field, and wherein each of the plurality of permission levels is associated with a highlight color;

decrypting the encrypted sensitive information field corresponding to the at least one redacted portion of the hardcopy document in accordance with a permission level of the mobile device associated with viewing the sensitive information of the sensitive information field;

capturing, by the mobile device, an image of the redacted hardcopy document; and generating a visual representation of the captured image of the hardcopy document on a display associated with the mobile device, the visual representation having the at least one redacted portion replaced with the decrypted sensitive information field a plurality of permission levels corresponding to an authorization to view a sensitive information field, each of the plurality of permission levels associated with a highlight color;

document identification correlating at least one permission level with the document; and device identification correlating a mobile device with at least one permission level of the document.

9. The method of claim 8, wherein retrieving the encrypted sensitive information field further comprises:

determining the document identification associated with the redacted hardcopy document;

generating a sensitive information request for the encrypted sensitive information field, the sensitive information request comprising the document identification and a device identification associated with the mobile device; and securely retrieving the encrypted sensitive information field in response to the submitted sensitive information request.

10. The method of claim 9, wherein the retrieved encrypted sensitive information field further comprises a position of the sensitive information field on the visual representation of the hardcopy document.

11. The method of claim 8, wherein generating a visual representation further comprises generating a display of an unredacted depiction of the redacted hardcopy document using augmented reality.

12. The method of claim 8, further comprising:

capturing a portion of the redacted hardcopy document containing at least one of a glyph or a two-dimensional code;

wherein retrieving the encrypted sensitive information field further comprises analyzing the at least one of a glyph or a code so as to identify the encrypted sensitive information field of the redacted hardcopy document; and wherein decrypting the encrypted sensitive information field further comprises determining a position of decrypted sensitive information field on the hardcopy document.

13. The method of claim 8, wherein the encrypted sensitive information field is located in a position on the redacted hardcopy document corresponding to a proper position of the sensitive information field when decrypted.

14. A field level document encryption system, comprising:

a processor;

a memory in communication with the processor;

an associated display;

an image capture component; and the memory storing instructions which cause the processor to:

retrieve an encrypted sensitive information field corresponding to at least one redacted portion of a redacted hardcopy document, decrypt the encrypted sensitive information field corresponding to the at least one redacted portion of the hardcopy document in accordance with a permission level associated with viewing sensitive information of the sensitive information field, capture, with the image capture component, an image of the redacted hardcopy document, and generate a visual representation of the captured image of the hardcopy document on the associated display, the visual representation having the at least one redacted portion replaced with the sensitive information from the decrypted sensitive information field in the visual representation of the captured image of the hardcopy document; and a data storage in communication with the processor, comprising:

a plurality of permission levels corresponding to an authorization to view a sensitive information field, each of the plurality of permission levels associated with a highlight color;

document identification correlating at least one permission level with the document; and device identification correlating a mobile device with at least one permission level of the document.

15. The system of claim 14, wherein the memory further includes instructions which cause the processor to:

determine a document identification associated with the redacted hardcopy document;

generate a sensitive information request for the encrypted sensitive information field, the sensitive information request comprising the document identification and a device identification associated with the mobile device; and securely retrieve the encrypted sensitive information field in response to the submitted sensitive information request.

16. The system of claim 14, wherein the memory further includes instructions which cause the processor to:

capture, with the image capture component, a portion of the redacted hardcopy document containing at least one of a glyph or a two-dimensional code;

wherein retrieval of the encrypted sensitive information field further comprises analyzing the at least one of a glyph or a code so as to identify the encrypted sensitive information field of the redacted hardcopy document; and wherein decryption of the encrypted sensitive information field further comprises determining a position of decrypted sensitive information field on the hardcopy document.

17. The system of claim 14, wherein the encrypted sensitive information field is located in a position on the redacted hardcopy document corresponding to a proper position of the sensitive information field when decrypted.

18. A system for field level encryption of a document, comprising:

a processor;

a memory in communication with the processor;

a printer engine;

a scanning component;

the memory storing instructions which cause the processor to:

capture, with the scanning component, an image of an original hardcopy document;

identify at least one sensitive information field contained in the hardcopy original document;

determine a permission level associated with viewing the sensitive information of the sensitive information field;

encrypt the identified sensitive information field in accordance with the determined permission level; and output, with the printer engine, a redacted hardcopy of the original hardcopy document having at least one redacted portion, wherein the at least one redacted portion corresponds to the encrypted sensitive information field, the encrypted sensitive information field being stored in the at least one redacted portion of the redacted hardcopy output, extracted and remotely stored from the redacted hardcopy output, or embedded on the redacted hardcopy output; and a data storage, comprising:

a plurality of permission levels corresponding to an authorization to view a sensitive information field, each of the plurality of permission levels associated with a highlight color;

document identification correlating at least one permission level with the document; and device identification correlating a mobile device with at least one permission level of the document.

19. The system of claim 18, wherein the memory further includes instructions which cause the processor to identify at least one highlighted portion of the image of the original document, wherein the color of the at least one highlighted portion is associated with the determined permission level corresponding to the identified sensitive information field.

20. The system of claim 18, wherein the memory further includes instructions which cause the processor to:

perform linguistic content analysis on text of the original document; and identify the sensitive information field in accordance with the performed analysis.

21. The system of claim 18, wherein the memory further includes instructions which cause the processor to:

generate a glyph including the encrypted sensitive information field and a corresponding location of the identified sensitive information field on the document; and render the glyph on the redacted hardcopy of the original document, so as to embed the glyph on the redacted hardcopy output.

\* \* \* \* \*